United States Patent Office 3,260,725
Patented July 12, 1966

3,260,725
3-TRICHLOROMETHYL-5-SUBSTITUTED-1,2,4-THIADIAZOLE
Hansjuergen A. Schroeder, New Haven, Conn., assignor to Olin Mathieson Chemical Corporation, a corporation of Virginia
No Drawing. Filed Mar. 15, 1961, Ser. No. 95,829
9 Claims. (Cl. 260—302)

This invention relates to a method of controlling soil fungi, nematodes, and other pests using certain 3-trichloromethyl - 5-substituted - 1,2,4-thiadiazoles having the formula:

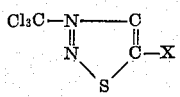

in which X is selected from the group consisting of Cl, $NH_2$, NHR, $NR_2$, OR and SR where R is an alkyl group of 1 to 4 carbon atoms. This invention also relates to these compounds as novel compositions of matter.

These novel 3-trichloromethyl - 5-substituted-1,2,4-thiadiazoles are outstandingly effective soil fungicides. Compounds of this group, when mixed into the soil, protect seeds and growing plants against an unusually broad spectrum of important pathogenic fungi, like species of Pythium, Fusarium, Rhizoctonia and Sclerotium. The activity against such fungi is generally superior to the best available fungicides in use against these pathogens. This broad spectrum of effectiveness is rare and contributes great economic potential to this invention. Furthermore, when applied to soil even at rates much higher than required for disease control, no injury occurred to seeded crops. Thus, cotton, corn, cucumber, pea and bean grow normally in soil containing 50 p.p.m. of a chemical of this group. Another advantage is the ability of preferred examples of this invention to control seedling diseases when the chemical is mixed only into the soil used to cover the seeds. A further advantage is the resistance of these compounds to removal from soil by rainfall leaching. Four inches of water did not appreciably reduce the control of the Pythium disease of cotton in one test of a member of this novel group of compounds. Still another advantage is the resistance of these compounds to microbiological degradation and physical inactivation in soil. Soil treated with 50 p.p.m. of one of these novel compounds and held for 30 days before planting still showed 100 percent control of the Pythium disease of cotton.

In addition to the above mentioned soil fungicide activity, compounds of this invention exhibit further utility in three other pesticidal areas: (1) for the control of nematodes attacking the roots of plants, (2) for the control of undesirable vegetation by applications to growing plants, (3) for the control of foliage diseases. Illustrations of such utility are given in examples of specific compounds which follow.

The novel 5-chloro compound is prepared by a novel procedure of reacting trichloromethylacetamidine or its hydrochloride with trichloromethanesulfenyl chloride in the presence of alkali. Advantageously and preferably the reaction is carried out in the presence of aqueous alkali and an inert immiscible organic solvent. Methylene chloride is preferred as the organic solvent but other inert halogenated or non-halogenated solvents may be used, for example, chloroform, carbon tetrachloride, ethylene dichloride, trichloroethylene, benzene, toluene and cyclohexane. The reaction proceeds rapidly at low temperatures, for example, −5 to +5° C., although higher or lower temperatures may be employed. The product is recovered from the organic solvent by any suitable means, for example, distillation.

The novel 5-chloro compound is a liquid having a refractive index at 21° C. of 1.572 and a boiling point of about 225° C. at atmospheric pressure. It is soluble in acetone, ether, petroleum ether and carbon tetrachloride.

The novel 5-ethoxy-compound is prepared from the 5-chloro compound by treatment with an alkali metal ethylate, conveniently prepared by dissolving the alkali metal in an excess of ethanol. The sodium, potassium or other alkali metal ethylate prepared in any other conventional manner is suitable. The reaction of the chloro compound with the ethylate proceeds rapidly at room temperature. By-product sodium chloride is removed and the product is recovered from solution, for example, by distillation.

The novel 5-ethoxy compound is a liquid having a refractive index at 30° C. of 1.5355 and a boiling point of 95° C. at 1 mm. Hg pressure. It is soluble in acetone, ether, petroleum ether and carbon tetrachloride.

The novel 5-methoxy and 5-butoxy compounds are prepared from the appropriate alkali metal alcoholates analogously to the ethoxy compound. The novel amino compounds are prepared from the 5-chloro compound by the action of ammonia or amines, for example, methylamine, diethylamine, or isopropylamine, advantageously dissolved in alcohol solution. Species of the compounds of this invention also include:

3-trichloromethyl-5-methylamino-1,2,4-thiadiazole
3-trichloromethyl-5-dimethylamino-1,2,4-thiadiazole
3-trichloromethyl-5-isopropylamino-1,2,4-thiadiazole
3-trichloromethyl-5-isopropoxy-1,2,4-thiadiazole
3-trichloromethyl-5-isobutylthio-1,2,4-thiadiazole
3-trichloromethyl-5-ethylthio-1,2,4-thiadiazole In small scale tests, these soil fungicides are effective in proportions of from about 5 to about 100 parts per million of soil. In larger scale operations, quantities of from 2 to 20 pounds or more per acre are suitable.

*Example I*

A solution of 65 grams (1.625 moles) of sodium hydroxide in 130 milliliters of water was added dropwise with stirring during 2 hours to a mixture of 75 grams (0.378 mole) of trichloroacetamidine hydrochloride, 70 grams (0.376 mole) of trichloromethanesulfenyl chloride and 500 milliliters of methylene chloride. The temperature was kept between −4° C. and 1° C. by cooling in an ice-salt mixture. The methylene chloride layer was separated, washed twice with 50 milliliters of water and dried with sodium sulfate. After evaporation of the solvent, the residue was vacuum distilled to obtain 50 grams (56 percent of the theoretical yield) of 3-trichloromethyl-5-chloro-1,2,4-thiadiazole. It boiled at 73° C. at 0.3 mm. Hg pressure and had $N_D^{21}=1.5720$.

*Analysis.*—Calc. for $C_3Cl_4N_2S$: C, 15.14; Cl, 59.61; N, 11.77; S, 13.47. Found: C, 15.25; Cl, 59.65; N, 11.91; S, 13.21.

The compounds of this invention were tested as a soil fungicide by the method of J. H. Reinhart entitled, "A Method of Evaluating Fungicides in the Soil Under Controlled Conditions," which appeared in Plant Disease Reporter 44: 648–652, 1960. Briefly, the method consists of prepariing the chemicals as a 10 percent dust, thoroughly blending with 90 percent of a mixture of Pyrax an Microcel (8:1). (Pyrax is a finely powdered aluminum silicate of the pyrophyllite type. Microcel is an adsorptive, synthetic calcium silicate.) The 10 percent dust is mixed into soil which has been infested with a pure culture of the fungus pathogen, and also seeded with a crop susceptible to the disease. The number of healthy plants obtained from the treated soils compared to those in untreated controls serves as a measure of disease control. Pathogen-host combinations used were *Rhizoctonia solani*-cotton, *Pythium ultimum*- cotton, *Fusarium oxysporum*-cucumber. The 3-trichloromethyl-5-chloro-1,2,4-thiadiazole produced 67 percent control of the Pythium disease of cotton at 50 parts per million of this compound in the soil.

The herbicidal activity was determined by the greenhouse method of Shaw and Swanson (Weeds 1: 352–365, 1952). As a post-emergent application at a rate of 16 pounds per acre, the 3-trichloromethyl-5-chloro-1,2,4-thiadiazole showed 100 percent control of the broad-leafed mustard and also of ryegrass. It also produced 80 to 100 percent control of pigweed, mustard and quackgrass at a rate of 8 pounds per acre when applied in acetone solution.

As a foliage fungicide, the compounds of this invention were tested by the standard slide-germination procedure of the American Phythopathological Society (Phytopathology 33: 627–632, 1943). The 3-trichloromethyl-5-chloro-1,2,4-thiadiazole produced 99 percent inhibition of spore germination of *Monilinia fructicola* at 12.5 parts per million.

Example II

A solution of 805 milligrams (0.035 mole) of sodium in 20 milliliters of anhydrous ethanol was added within 5 minutes with stirring to a solution of 8.3 grams (0.035 mole) 3-trichloromethyl-5-chloro-1,2,4-thiadiazole in 20 milliliters of ethanol. After an additional 10 minutes the reaction mixture was neutral and it was then filtered to remove precipitated sodium chloride. Excess ethanol was evaporated and the residue was vacuum distilled to obtain 7.2 grams (83 percent of the theoretical yield) of 3-trichloromethyl-5-ethoxy-1,2,4-thiadiazole. It boiled at 94.5° C. at 1 mm. Hg pressure and had $N_D^{30}=1.5355$.

*Analysis.*—Calc. for $C_5H_5Cl_3N_2OS$: C, 24.26; H, 2.05; Cl, 42.97; N, 11.32; S, 12.95. Found: C, 24.03; H, 2.05; Cl, 43.28; N, 11.29; S, 13.03.

The 3 - trichloromethyl-5-ethoxy-1,2,4-thiadiazole was tested as a soil fungicide against Pythium, Fusarium and Rhizoctonia by the method of Reinhart cited in Example I. The experimental results which were obtained in comparison with other reference soil fungicides are shown in the following table:

| Chemical | Conc., p.p.m. | Pythium | Percent Disease Control | |
|---|---|---|---|---|
| | | | Fusarium | Rhizoctonia |
| 3-trichloromethyl-5-ethoxy-1,2,4-thiadiazole | 100 | | 93 | 98 | 84 |
| | 50 | 100 | 87 | 88 | 97 |
| | 25 | 100 | 90 | 86 | 49 |
| | 12.5 | 96 | 61 | 100 | 35 |
| | 6.25 | 100 | | | |
| "Zinc Omadine" (Zinc pyridinethione) U.S. Patent 2,809,971 | 100 | | 96 | | |
| | 50 | 89 | 87 | | |
| | 25 | 53 | 71 | | |
| | 12.5 | 57 | 67 | | |
| | 6.25 | 72 | | | |
| "Captan" (N-trichloromethylmercapto-4-cyclohexene-1,2-dicarbox-amide) | 100 | | | 82 | |
| | 50 | | | 68 | |
| | 25 | | | 11 | |
| | 12.5 | | | 0 | |
| "Terraclor" (Pentachloronitrobenzene) | 100 | | | | 85 |
| | 50 | | | | 91 |
| | 25 | | | | 85 |
| | 12.5 | | | | 65 |

These data show the effectiveness of this compound against a broad spectrum of important soil fungi and its outstanding effectiveness against Pythium at such low concentrations as 6.25 parts per million. This compound has the rare and unexpected property of combining exceptional activity against Pythium with satisfactory control of Fusarium and Rhizoctonia.

The 3 - trichloromethyl-5-ethoxy-1,2,4-thiadiazole was further tested against *Scerotium rolfsii* attacking Black Valentine bean and compared with "Zinc Omadine" with the following results:

| Chemical | Conc., p.p.m. | Percent Control |
|---|---|---|
| "Zinc Omadine" | 100 | 56 |
| | 50 | 53 |
| | 25 | 17 |
| 3-Trichloromethyl-5-ethoxy-1,2,4-thiadiazole | 100 | 69 |
| | 50 | 40 |
| | 25 | 0 |

Control of Pythium attacking cotton growing in non-sterilized soil was shown by mixing 3-trichloromethyl-5-ethoxy-1,2,4-thiazole into the soil with the following results.

Conc., p.p.m.: Stand, percent
25 _____ 77
10 _____ 72
5 _____ 57
1 _____ 4
Infested check _____ 0
Uninfested check _____ 51

The stand in the uninfested check was low, but the improvement obtained by application of this chemical shows that it controlled Pythium and also an unidentified pathogen of cotton present in the uninfested soil.

Tested as a foliage fungicide, by the method stated in Example I, the 3-trichloromethyl-5-ethoxy-1,2,4-thiadiazole in duplicate tests showed 75 and 98 percent inhibition of spore germination of *Monilinia fructicola* at 200 p.p.m. and complete inhibition at 400 p.p.m.

Further evaluation for the control of foliage disease was conducted by the method of McCallan et al. ("A Greenhouse Method of Evaluating Fungicides by Means of Tomato Foliage Diseases," contrib. Boyce Thompson Inst. 13; 93–134, 1943). Tomato plants were sprayed with a series of concentrations of the chemical in distilled water. After the spray dried, the plants were inoculated with spores of *Alternaria solani* and held at conditions favorable for disease to develop. The number of disease lesions on the leaves was counted and compared with the number developing on the untreated control plants. The ratio of these two numbers is expressed as percent disease reduction. In this test, the 3-trichloromethyl-5-ethoxy-1,2,4-thiadiazole produced 95 percent disease reduction from sprays of 250 p.p.m.

This compound was also shown to exhibit nematocidal activity against a species of Meloidogyne which produces galls or rootknots on the roots of tomato, squash, etc. In this test, steam-sterilized soil is infested with 6 grams of finely chopped galled tomato roots per gallon of soil. The chemical is then mixed with the soil at rates of 0.1 to 0.5 gram per gallon which are equivalent to field rates of nematocides now in use. The treated infested soil is covered and held for one week, after which a tomato plant and several squash seeds are transplanted into four replicate sub-samples. About 4 weeks later, the roots are washed free of soil and the effectiveness of the chemical is determined by counting the number of galls from treated versus untreated soil. In this test, the 3-trichloromethyl - 5 - ethoxy-1,2,4-thiadiazole produced 63 percent rootknot control at 0.5 gram per gallon, without causing injury to squash or tomato.

As a post-emergent application tested by the method of Shaw and Swanson, cited in Example 1, this novel compound also produced 60 percent control of mustard and ryegrass at a rate of 16 lbs. per acre.

Example III

A solution of sodium methylate prepared by dissolving 3 grams (0.13 mole) of sodium in 100 milliliters of methanol was added to 31 grams (0.13 mole) of 3-trichloromethyl-5-chloro-1,2,4-thiadiazole in 35 milliliters of methanol. After stirring for five minutes, the mixture was neutral. It was filtered to remove precipitated sodium chloride and the methanol was removed from the filtrate under reduced pressure. Addition of 50 milliliters of petroleum ether to the residue precipitated additional salt which was filtered off. The filtrate was evaporated under reduced pressure at 50° C. and the residue was fractionated. The yield of liquid 3-trichloromethyl-5-methoxy-1,2,4-thiadiazole was 27 grams (89.5 percent of theory) boiling at 62° C. at 0.2 mm. Hg pressure and having $N_D^{26}=1.5502$.

Analysis.—Calc. for $C_4H_3Cl_3N_2OS$: C, 20.57; H, 1.30; Cl, 45.55; N, 12.00; S, 13.73. Found: C, 20.45; H, 1.54; Cl, 45.85; N, 12.10; S, 13.52.

Tested as a post-emergence herbicide by the method cited in Example I this compound showed 90 percent control of mustard when applied at the rate of 20 pounds per acre.

As a soil fungicide, this chemical produced 94 percent control of Pythium attacking cotton when applied at the rate of 50 p.p.m. mixed into the infested soil. In a further dosage-response test against the Pythium disease of cotton, the 3-trichloromethyl-5-methoxy-1,2,4-thiadiazole exhibited unusually high effectiveness at low dosages as shown by the following data.

| Conc., p.p.m.: | Percent control |
|---|---|
| 10 | 81 |
| 5 | 76 |
| 2.5 | 79 |
| 1 | 14 |

Example IV

A solution of sodium n-butylate prepared by dissolving 3 grams (0.13 mole) of sodium in n-butanol was added to 31 grams (0.13 mole) of 3-trichloromethyl-5-chloro-1,2,4-thiadiazole in 30 milliliters of n-butanol. The sodium chloride which precipitated on standing at 40° C. for 15 minutes was not readily filterable. Most of the n-butanol was removed by evaporation in vacuo and 100 milliliters of petroleum ether was added. The salt was filtered off, the filtrate was stripped of solvents and the residue was distilled in vacuo. The yield of 3-trichloromethyl-5-n-butoxy-1,2,4-thiadiazole was 31 grams (86.5 percent of theory) boiling at 93° at 0.2 mm. Hg pressure and having $N_D^{25}=1.5222$.

Analysis.—Calc. for $C_7H_9Cl_3N_2OS$: C, 30.50; H, 3.29; Cl, 38.60; N, 10.17; S, 11.63. Found: C, 30.47; H, 3.19; Cl, 38.54; N, 10.01; S, 11.35.

As a post-emergence herbicide, the 3-trichloromethyl-5-n-butoxy-1,2,4-thiadiazole showed 90 percent control of mustard when applied at 20 pounds per acre. As a foliage fungicide, this compound showed 82 percent inhibition of spore germination of *Monilinia fructicola* at a concentration of 100 parts per million and total inhibition at 400 p.p.m.

Example V

To a solution of 19 grams (0.08 mole) of 3-trichloromethyl-5-chloro-1,2,4-thiadiazole in 50 milliliters of ethanol was added at 10 to 15° C. a 10 percent solution of ammonia in ethanol. A slow stream of ammonia gas was passed through the solution at 25° C. for two hours. Ethanol was evaporated in vacuo at 80° C. and the residue was stirred with 100 milliliters of water, filtered and dried over $P_2O_5$ in vacuo. The 16 grams of product was re-crystallized twice from benzene to obtain 13 grams (74.5 percent of theory) of 3-tricholormethyl-5-amino-1,2,4-thiadiazole melting at 196° C.

Analysis.—Calc. for $C_3H_2Cl_3N_3S$: C, 16.49; H, 0.92; Cl, 48.68; N, 19.23; S, 14.67. Found: C, 16.67; H. 1.20; Cl, 48.55; N, 19.31; S, 14.57.

Tested against Pythium attacking cotton at 50 p.p.m. mixed into the soil, the 3-trichloromethyl-5-amino-1,2,4-thiadiazole produced 78 percent disease control. As a foliage fungicide, 100 p.p.m. of this compound showed 48 percent inhibition of spore germination of *Monilinia fructicola* and complete inhibition at 400 p.p.m.

Example VI

A solution of 14.6 grams of diethylamine (0.2 mole) in 70 milliliters of benzene was added to a solution of 23.8 grams of 3-trichloromethyl - 5-chloro - 1,2,4-thiadiazole (0.1 mole) in 50 ml. of benzene. After keeping the reaction mixture for ½ hour at 40° C. the separated diethylamine hydrochloride was filtered and the filtrate was evaporated in vacuo. The residual 3-trichloromethyl-5-diethylamino-1,2,4-thiadiazole was recrystallized from petroleum ether. Yield, 25.3 g. or 92 percent of theory, M.P. 55° C.

Analysis.—Calc. for $C_7H_{10}Cl_3N_3S$: C, 30.61; H, 3.67; Cl, 38.74; N, 15.30; S, 11.67. Found: C, 30.43; H, 3.75; Cl, 38.78; N, 15.11; S, 11.69.

The 3-trichloromethyl-5-diethylamino-1,2,4-thiadiazole was tested as a post-emergence herbicide at the rate of 16 pounds per acre and showed 60 percent control of mustard.

What is claimed is:

1. A 3-trichloromethyl-5-substituted-1,2,4-thiadiazole having the formula $$Cl_3C-C=N$$
$$\quad \| \quad \| $$
$$N \quad C-X$$
$$\quad \diagdown S \diagup$$

in which X is selected from the group consisting of Cl, $NH_2$, NHR, $NR_2$, OR and SR where R is an alkyl group of 1 to 4 carbon atoms.

2. The compound of claim 1 in which X is $NH_2$.
3. The compound of claim 1 in which X is $NHC_2H_5$.
4. The compound of claim 1 in which X is $N(CH_3)_2$.
5. The compound of claim 1 in which X is $OC_2H_5$.
6. The compound of claim 1 in which X is $SCH_3$.
7. The compound of claim 1 in which X is $OCH_3$.
8. The compound of claim 1 in which X is O-isopropoxy.
9. The compound of the formula $$Cl_3C-C=N$$
$$\quad \| \quad \| $$
$$N \quad C-Cl$$
$$\quad \diagdown S \diagup$$

References Cited by the Examiner

UNITED STATES PATENTS

| 2,860,962 | 11/1958 | Bluestone | 71—2.5 |
| 2,899,439 | 8/1959 | Korman | 260—306.8 |
| 2,943,017 | 6/1960 | Sasse | 260—308 |
| 2,953,491 | 9/1960 | Hardy | 260—308 |
| 2,992,226 | 7/1961 | Chambers | 260—302 |

FOREIGN PATENTS 960,281 3/1957 Germany.

OTHER REFERENCES

Goerdeler et al.: Chem. Ber., volume 90, pp. 182–7 (1957).

ALEX MAZEL, *Primary Examiner.*

IRVING MARCUS, WALTER A. MODANCE, NICHOLAS S. RIZZO, HENRY JILES, *Examiners.*

D. T. McCUTCHEN, ALTON D. ROLLINS,
*Assistant Examiners.*

UNITED STATES PATENT OFFICE
CERTIFICATE OF CORRECTION

Patent No. 3,260,725                          July 12, 1966

Hansjuergen A. Schroeder

It is hereby certified that error appears in the above numbered patent requiring correction and that the said Letters Patent should read as corrected below.

Column 1, lines 14 to 17, the formula should appear as shown below instead of as in the patent:

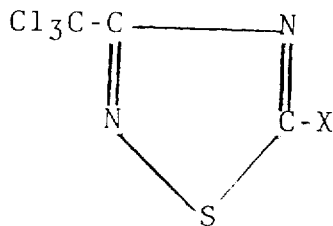

Signed and sealed this 1st day of August 1967.

(SEAL)
Attest:

EDWARD M. FLETCHER, JR.
Attesting Officer

EDWARD J. BRENNER
                                        Commissioner of Patents